Oct. 14, 1958  J. C. OWEN  2,856,141
AUTOMATIC CONTROL FOR CRAFT RUDDER
Original Filed June 23, 1949  2 Sheets-Sheet 1

INVENTOR.
JOHN C. OWEN
BY
Oscar B Brumback
ATTORNEY

Oct. 14, 1958  J. C. OWEN  2,856,141
AUTOMATIC CONTROL FOR CRAFT RUDDER
Original Filed June 23, 1949  2 Sheets-Sheet 2

INVENTOR.
JOHN C. OWEN
BY
Oscar B Brumback
- ATTORNEY -

2,856,141
Patented Oct. 14, 1958

United States Patent Office

2,856,141

AUTOMATIC CONTROL FOR CRAFT RUDDER

John C. Owen, Palisades Park, N. J., assignor to Bendix Aviation Corporation, Teterboro, N. J., a corporation of Delaware Original application June 23, 1949, Serial No. 100,915, now Patent No. 2,759,689, dated August 21, 1956. Divided and this application August 13, 1953, Serial No. 373,989

12 Claims. (Cl. 244—77)

This application is a division of my copending application Serial No. 100,915, filed June 23, 1949, now Patent No. 2,759,689.

The present invention relates to automatic steering systems for mobile craft generally and more particularly to a novel automatic steering system for aircraft wherein coordinated turns may be achieved by controlling craft heading through the ailerons and the dynamic vertical is utilized to prevent skid or slip.

Conventional control of the path of a craft in direction is accomplished by means of azimuth headings and rates of turns and it is the sum of these headings and turns that make up the ground and horizontal air tracks. When an automatic steering system is employed on the craft the foregoing tracks are executed by the operation of the manual course controller unit of the system or by the automatic tracking of a radio beam or other track references. Whatever the nature of the track executed and whatever its means of execution, its accomplishment represents the sum of headings and turns. However, it will be recognized that a constant heading is also a rate of turn, i. e., zero rate of turn. From this it follows that all ground tracks regardless of their nature or origin are developed solely by rates of turn. Once the foregoing is recognized it becomes apparent that to control a craft to any desired track it is necessary only to control the rate of turn and that any deviation from reference should result in a corrective rate of turn. These considerations will prevail no matter what the reference source may be, i. e., whether it be a magnetic compass, directional gyro, a manual controller unit of an automatic pilot, a radio guidance beam or a homing beam, since such references are merely variations of the same problem.

The conventional method for obtaining a coordinated craft turn is to resolve airspeed and rate of turn and apportion rudder and aileron control accordingly. In the manual controller units and the radio flight path computers of known automatic steering systems, this method is used empirically for one airspeed and one rate of turn. The settings thus obtained are naturally incorrect for any other values of airspeed or rate of turn.

As distinguished from known arrangements, the present invention contemplates the utilization of the dynamic vertical as a reference whereby coordinated craft turns may be obtained. With such an arrangement either the rudder or the aileron may be considered the master and the follower. Craft turn is induced by the master and the follower is controlled solely by the dynamic vertical so as to prevent skid or slip. A system of this nature results in a simple arrangement giving an exact solution instead of a complex device giving only an approximate solution as heretofore.

In accordance with the present invention, the dynamic vertical reference is defined by a pendulum, mounted with its axis of rotation parallel with the craft fore and aft axis, so that it also can be utilized to provide a yaw acceleration signal usable directly as an automatic pilot control signal or it may be integrated once to provide a yaw rate signal for control purposes.

An object of the present invention, therefore, is to provide a novel automatic steering system for aircraft by means of which coordinated turns may be readily executed.

Another object of the invention is to provide a novel automatic steering system for aircraft in which directional control of the craft is effected through the aileron channel only.

A further object is to provide a novel automatic pilot for aircraft in which the rudder is controlled in accordance with the dynamic vertical.

A still further object is to provide a novel automatic pilot for aircraft in which rudder is controlled in accordance with the dynamic vertical, yaw acceleration and/or yaw rate.

Another object is to provide a novel automatic trim provision for an aircraft in heading.

A further object of the invention is to provide a novel automatic pilot with the use of which control of a craft results in a more comfortable ride, less strain is imposed on the airframe, and more accurate control to azimuth reference is obtained.

Another object is to provide a novel and versatile automatic pilot of greatly simplified design in which certain control devices such as rate gyros, for example, heretofore required have been eliminated.

A further object is to provide a novel automatic pilot which is self compensating for out-of-trim conditions to a much greater extent than with systems heretofore in use.

The above and other objects and advantages of the present invention will appear more fully hereinafter from a consideration of the detailed description which follows, taken together with the accompanying drawings wherein several embodiments of the invention are illustrated. It is to be expressly understood, however, that the drawings are for the purpose of illustration and description only and are not designed as a definition of the limits of the invention.

In the drawings wherein like reference characters refer to like parts throughout the several views, Figure 1 is a diagrammatic illustration of the rudder control channel of the novel automatic pilot of the present invention wherein an undamped pendulum is mounted forward of the craft's center of gravity for rudder control;

In accordance with the present invention, the pendulum for rudder control may be either damped or undamped and mounted forward of the craft's center of gravity so that it will be responsive to both displacement from the dynamic vertical and yaw acceleration or it may be highly damped or mounted at the craft's center of gravity in which event it will respond to displacement from dynamic vertical only.

Figure 1:
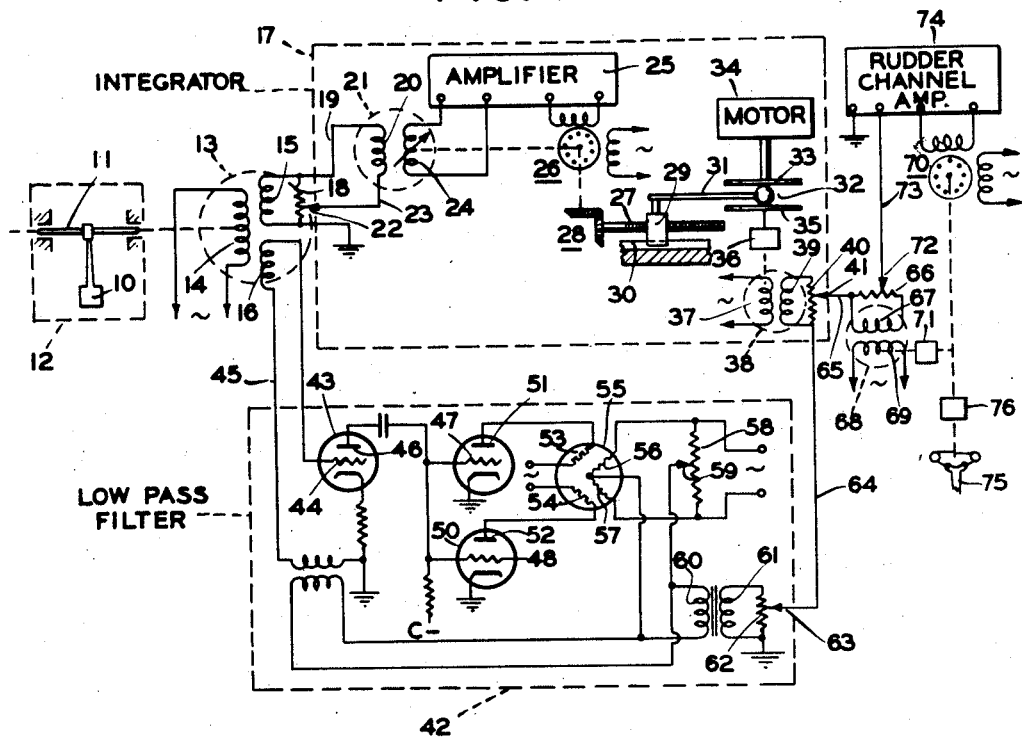

The arrangement utilizing an undamped pendulum forward of the craft's center of gravity for rudder control is shown in Figure 1 of the drawings. In this arrangement, a pendulum 10 is supported by a transverse shaft 11 which is rotatably mounted within suitable bearings carried by a casing 12 fixed to the craft forward of its center of gravity, the axis of shaft rotation being parallel with the craft's fore and aft axis. By virtue of such mounting the pendulum will be displaced relative to the craft vertical axis during craft roll about its longitudinal or fore and aft axis.

In order that a workable signal for rudder control may be generated or developed in accordance with the amount of craft displacement from the dynamic vertical during a turn, or from true vertical during straight flight, a signal generator in the form of a two-part inductive device, generally designated with the reference character 13, is provided. Device 13 comprises a wound rotor 14, connected for energization with a suitable source of single phase alternating current and for displacement by pendulum 10 relative to its stator, the latter being fixed to the craft and having two windings 15 and 16. Because of the interconnection of rotor 14 with the pendulum, the pendulum will displace the rotor angularly so that a signal will be developed in windings 15—16 proportional to the amount of deviation of the craft vertical axis relative to the pendulum.

The voltage output of inductive device 13 produced by the pendulum actually represents two separate and distinct quantities, i. e., dynamic vertical displacement and yaw acceleration. Dynamic vertical displacement is a relatively long period persistent quantity, whereas movement of the pendulum due to yawing is of a relatively high frequency and usually not persistent.

While the total pendulum output consisting of these two quantities may be used directly for rudder control, the arrangement of Figure 1 utilizes a third or yaw rate signal, all three combining to control rudder. To this end a selective integrator, generally designated with the reference character 17, is provided to integrate the short time signals of yaw acceleration to give a yaw rate signal which is connected in series with the yaw acceleration and dynamic vertical displacement signals.

Stator winding 15 of inductive device 13 has a resistor 18 arranged thereacross. One end of resistor 18 is grounded as shown and the opposite end connects by way of a lead 19 with a fixed stator winding 20 of a coupling inductive device 21 of the integrator. The free end of the winding 20 connects by way of a lead 23 with an adjustable contact 22, engageable with resistor 18. Inductively coupled with stator 20 is a displaceable wound rotor 24 whose signal, developed by induction, as a result of a signal at stator winding 15, is communicated with the input of a conventional amplifier 25; the output of amplifier 25, in turn, connects with the variable phase winding of a two phase induction motor 26 which is mechanically coupled by suitable means with rotor 24.

As soon as a signal is developed in rotor 24 of device 21, motor 26 is energized to drive rotor 24 to a null at which time the motor is de-energized. As the motor drives rotor 24 to a null, it rotates a worm gear 27 by way of a suitable gear system 28. Threadedly sleeved on the worm gear is a block 29. This block is held against rotation by a track 30 so that it will move linearly only relative to the worm gear. Block 29 has fastened thereto a ball supporting carriage 31 so as to move a ball 32 from a central position relative to an annular disc 33 driven by a constant speed motor 34. Displacing ball 32 relative to the center of disc 33 causes rotation of a parallel disc 35, also engaged by the ball. Disc 35 connects through a gear reduction system 36 with the wound rotor 37 of an inductive device 38 which includes a fixed wound stator 39. As a result of the angular displacement of rotor 37 by the ball and disc integrator a yaw rate signal apears at stator 39. A resistor 40 is arranged across the stator and is engageable by an adjustable contact 41.

While some of the vertical displacement signal is integrated along with the yaw acceleration signal by way of integrator 17, the vertical displacement signal generated by the pendulum may be segregated from the yaw acceleration signal to be added with the yaw acceleration and/or yaw rate signal for control of rudder. Since the signal due to dynamic vertical displacement is of a relatively low frequency, a low pass filter of the character shown and described in copending application Serial No. 90,236, filed April 28, 1949, now Patent No. 2,754,418, may be utilized to isolate or pass only the signal due to displacement from the dynamic vertical.

The low pass filter, generally designated with the reference character 42, comprises a tube 43 whose grid 44 is connected with stator winding 16 of inductive device 13, the opposite end of the winding being grounded by way of a lead 45. Plate 46 of the tube connects with the grids 47 and 48 of discriminator tubes 49 and 50 whose plates 51 and 52, in turn, connect with the heater elements 53 and 54, respectively, of a thermal time delay device 55. Elements 53 and 54 are arranged in heat exchange relation with resistor elements 56 and 57. These resistor elements constitute the adjoining arms of a Wheatstone bridge whose remaining two arms are defined by the portion of a tapped resistor 58 above and below a movable contact 59. The output of device 55 appears across the primary 60 of a transformer whose secondary 61 has a resistor 62 connected thereacross, one end of the resistor being grounded and being engaged by an adjustable contact 63. The signal due to dynamic vertical displacement appears at contact 63, the high frequency signal due to yaw acceleration being blocked by filter 42 and therefore not passed by it in the manner more fully described in the aforementioned copending application.

The dynamic vertical displacement signal appearing at contact 63 is fed in series by way of a lead 64 with the yaw rate signal appearing at contact 41 of inductive device 38, the latter signal, in turn, being connected in series by way of a lead 65 with one end of a resistor 66 connected across the fixed stator winding 67 of an inductive follow-up device 68, whose wound rotor 69 is displaced by a rudder servomotor 70 through a gear reduction system 71. Resistor 66 is engaged by an adjustable contact 72 which connects by way of a lead 73 with the input of a rudder channel amplifier 74.

As shown in Figure 1, therefore, operation of rudder 75 by motor 70 through a gear reduction system 76 is under the control of signals due to dynamic vertical displacement, yaw rate and follow-up. If desired, the yaw acceleration signal appearing at the stator of inductive device 13 can be brought directly in series with the other signals so that rudder may be controlled in accordance with yaw acceleration, yaw rate, dynamic vertical displacement and follow-up. Instead of making a direct connection to inductive device 13, a filter, similar to filter 42 but having a delay device 55 of a rapid time constant may be utilized to block the low frequency signal of dynamic veitical displacement and pass only the high frequency signal of yaw acceleration. In the latter case integrator 17 would integrate only the signal due to yaw acceleration. It is desirable, however, to pass the dynamic vertical displacement signal along with the yaw acceleration signal so as to integrate the former signal as a result of which a self trim rudder condition is derived in a manner to appear more fully hereinafter.

Since the total pendulum signal is the sum of two distinct and separate quantities, i. e., dynamic vertical displacement and yaw acceleration, it is necessary, for this sum to be used in rudder control, to locate the pendulum in such a manner that each component of the composite signal be of the proper sign. With the pendulum mounted with its axis of rotation parallel to the craft's fore and aft axis, as shown in Figure 1, it is necessary to locate the pendulum forward of the craft's center of gravity so that the yaw signals will be of the correct sign with respect to the control applied by the dynamic vertical component.

By utilizing an integrated yaw acceleration signal whereby a yaw rate signal is derived in the manner shown in Figure 1, the two-degree-of-freedom rate gyro commonly used for obtaining a rate signal is eliminated thereby simplifying the overall control system.

Figure 2:
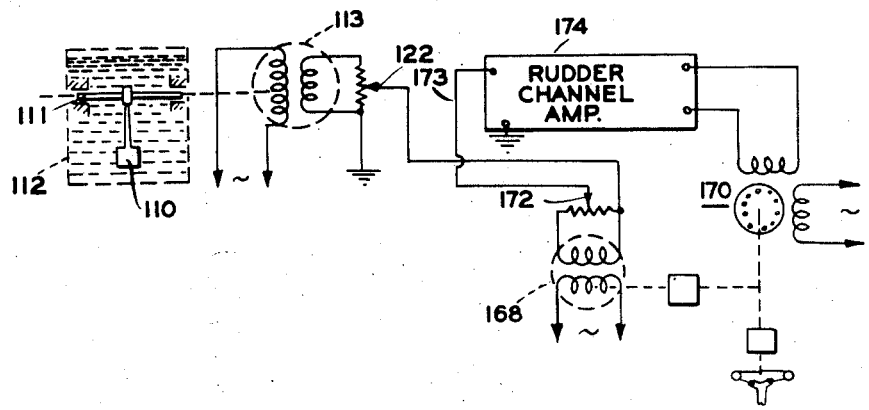
Figure 2 is a view similar to that of Figure 1 of a modification of the present invention wherein a damped pendulum is mounted forward of the craft's center of gravity for rudder control.

In place of the undamped pendulum of Figure 1, substantially the same control may be effected by the use of a damped pendulum mounted forward of the craft's center of gravity with its axis of rotation parallel with the craft's fore and aft axis as shown in Figure 2. In this modification, pendulum 110 is fastened to transverse shaft 111 which is supported for rotation in suitable bearings carried by casing 112 which is fixed to the craft. Casing 112 may be filled with oil, or other damping means in the form of air or oil dash pots may be provided, so that the oil or other damping medium acts as an integrator for the higher frequencies of yaw acceleration. In this event, signal generator 113 will develop directly at adjustable contact 122 a composite signal representing both yaw rate and dynamic vertical displacement. The yaw rate and dynamic vertical displacement signals appearing at contact 122 are fed by a suitable lead in series with the follow-up signal appearing at contact 172 of inductive follow-up device 168 and fed therefrom to the input of amplifier 174 by way of a lead 173 for operating rudder motor 170.

Figure 3:
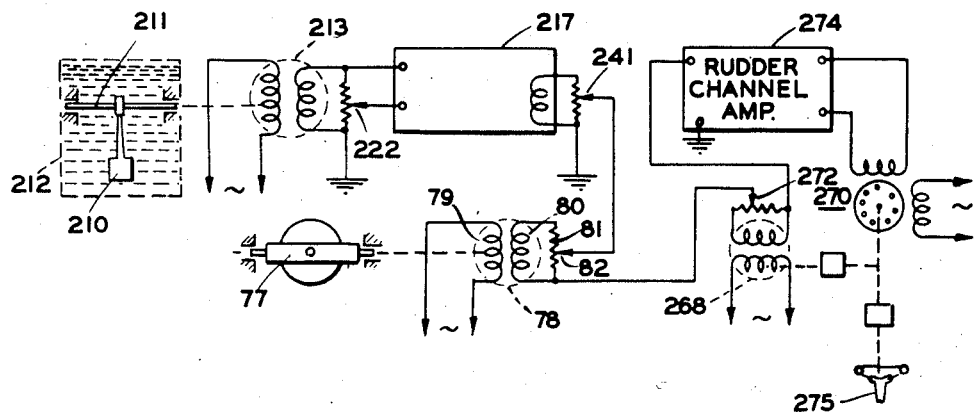
Figure 3 is a view similar to that of Figure 1 of a further modification of the present invention wherein a highly damped pendulum is mounted forwardly of the craft's center of gravity for rudder control; and, Figure 4 is a diagrammatic illustration of the aileron channel of the novel automatic pilot hereof.

The arrangement of Figure 3 constitutes a slight variation over the systems of Figures 1 and 2 in that it utilizes a highly damped pendulum mounted forward of the craft's center of gravity so as to exclude or severely attenuate the higher frequencies of yaw. In this event, pendulum 210 is fastened to transverse shaft 211 which swings in a casing 212 fixed to the craft and filled with oil or other damping fluid. In place of the highly damped pendulum mounted forward of the craft's center of gravity, the pendulum may be undamped and mounted at the craft's center of gravity where no yaw motion can be detected by the pendulum. In either case, the useful output of the pendulum is solely dynamic vertical displacement and the signal developed or generated at inductive device 213 and appearing at contact 222 will be that due solely to dynamic vertical displacement. The signal appearing at contact 222 may be fed directly to control rudder or it may be, as shown in Figure 3, integrated by integrator 217 in which event an integrated dynamic vertical displacement signal will appear at contact 241.

In order to provide the craft with proper damping in yaw when the foregoing arrangement is utilized, it becomes necessary to introduce yaw rate from some other source. To this end, therefore, a two-degree-of-freedom rate gyro 77 is provided, with its axis of precession arranged parallel with the craft fore and aft axis, and having an inductive rate signal generator device 78 associated therewith. Device 78 comprises a wound rotor 79 movable by the gyro and an inductively coupled fixed stator 80 having a resistor 81 thereacross engaged by an adjustable contact 82 connected in series with adjustable contact 241.

The rate signal, developed by gyro 77, and the integrated dynamic vertical displacement signal are connected in series with the follow-up signal generated by inductive follow-up device 268 and appearing at adjustable contact 272, all three signals being communicated to the input of rudder amplifier 274 to operate motor 270 and thereby control rudder 275.

Figure 4:
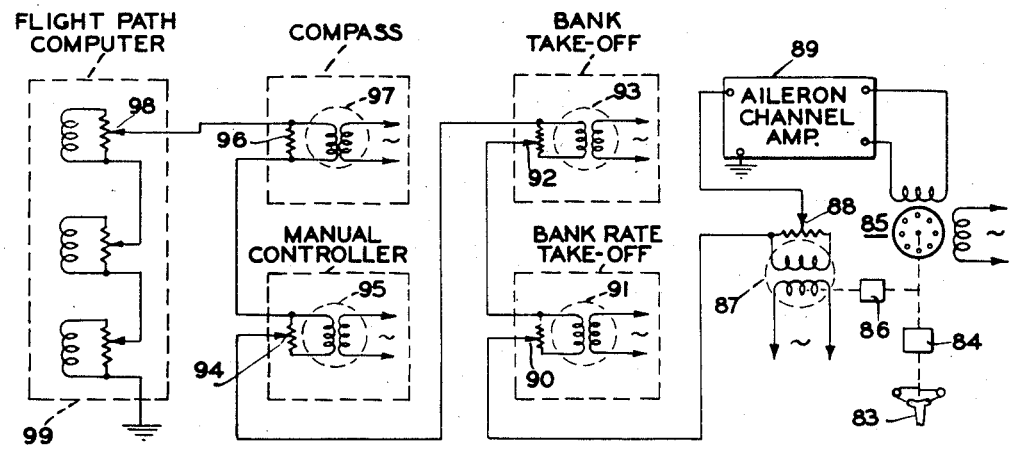

Whichever of the above described rudder control systems are utilized, the aileron channel only receives the heading signal. As shown diagrammatically in Figure 4, aileron 83 is displaceable from a normally centered position through a gear reduction system 84 by an aileron servo motor 85 which also operates through a gear reduction system 86 to displace the rotor of an inductive follow-up device 87 to generate at an adjustable contact 88 of the latter a follow-up signal. Fed in series with the follow-up signal into the input of an aileron channel amplifier 89 for operating aileron motor 85 may be a bank rate signal appearing at an adjustable contact 90 of a bank rate take-off or inductive device 91, a bank or roll signal appearing at an adjustable contact 92 of a bank take-off or inductive device 93, an arbitrary course signal appearing at an adjustable contact 94 of an inductive course setter device 95 whose rotor is displaceable manually by the pilot, a compass or heading signal appearing across a resistor 96 of an inductive compass device 97, and a radio track reference signal appearing across an adjustable contact 98 of a known flight path computer unit 99.

It will now be apparent to those skilled in the art that when a craft, bearing the novel automatic pilot system hereof, is subjected to a change of course as, for example, by the operation of the manual controller, ailerons will be operated to place the craft into a turn attitude. If during the turn the angle of bank is other than that required for the selected turn, the pendulum will be displaced relative to the dynamic vertical to thereby generate a corrective rudder signal whereby the pendulum acts during a turn to prevent craft skid or slip. As pointed out hereinabove, a signal due solely to dynamic vertical displacement may be used for rudder control or it may be integrated as shown in Figure 3 to control rudder. In addition to the dynamic vertical displacement signal, a yaw rate signal developed in the manner shown in Figure 2 may be utilized or yaw rate and yaw acceleration signals may be utilized as shown in Figure 1. Whichever arrangement is selected, the pendulum will effectively prevent side slip or skid of the craft so that the craft vertical axis will coincide with the dynamic vertical.

Where the dynamic vertical displacement signal is utilized as shown in Figure 3 for rudder control, it will be noted that subsequent to a craft displacement from course and a return thereto ball 32 of integrator 17 (217) will be displaced relative to its control position and discs 33 and 35 so that a signal will continue to appear at adjustable contact 41 (241) even though the craft has returned to course and the ailerons have been centered at which time the signal at contact 222 has dropped to zero. Only a craft deviation in an opposite direction, at which time motor 26 is reversed, will return ball 32 back to its central and inoperative position.

The above consideration will aid in a better understanding of the manner in which the novel system hereof acts to provide automatic trim in heading. It may be assumed, as an example, that one of two engines on a craft incorporating the novel automatic pilot hereof has failed. As a result of such engine failure the craft will roll somewhat and turn in the direction of the low wing on the side of the craft bearing the dead engine. The compass signal of inductive device 97 resulting from craft departure from the desired course is fed to the ailerons whereupon the latter are actuated to lift the low wing to cause the craft to turn in the opposite direction. In the absence of the novel arrangement hereof, a state of balance will be reached between the torque resulting from the aerodynamic drag of the dead engine and the compass signal so that even though the wing which was lowered by the dead engine has now been lifted it will merely tend to return the craft to course, such return never being accomplished. With the novel arrangement hereof, however, due to the displacement of the craft vertical axis from the true vertical by the lifted wing the pendulum will be displaced relative to the craft to develop a signal representing the displacement of the craft vertical axis.

Pendulum displacement therefor develops a signal which is integrated by integrator 17 (217), ball 32 of the integrator being displaced from its central position relative to the discs 33 and 35 to provide an integrated dynamic vertical signal at contact 41 (241). The latter signal aids or supplements the compass signal acting on the ailerons by displacing rudder so as to cause the craft to return to course at which time the compass signal will drop to zero. On arriving at the desired course the craft will straighten out so that the craft's vertical axis coincides with the true vertical. At this time, the signal developed by the pendulum will drop to zero, and motor 26 will re-center ball 32 relative to its discs. Inasmuch as rotor 37 of inductive device 38 remains offset from its null position, a signal is available at contact 41 (241) so that rudder remains applied and in this manner the integrated signal compensates for the unbalance due to the dead engine to maintain the craft on course. Any deviation from course thereafter will result in a compass signal which will act to operate aileron to return the craft to course.

Where, during a turn, the craft's vertical axis departs from the dynamic vertical, the pendulum will be displaced relative to the craft to generate in inductive device 13 (113 or 213) a rudder signal which will prevent side slip or skid.

It will now be apparent to those skilled in the art that a novel automatic steering system has been provided hereby with the use of which coordinated turns are readily obtained, side slip or skid automatically avoided, and rudder trim provision automatically developed when required.

Although several embodiments of the invention have been illustrated and described in detail it is to be expressly understood that the invention is not limited thereto. For example, while a mechanical type integrator has been shown it will be apparent that any conventional electric integrator could be used equally as well. Various other changes may also be made in the design and arrangement of the parts without departing from the spirit and scope of the invention as the same will now be understood by those skilled in the art.

I claim:

1. An automatic control system for a craft rudder to coordinate turning of the craft initiated by craft aileron, comprising a pendulum positioned forwardly of the craft center of gravity, means mounting said pendulum for movement about an axis parallel with the craft fore and aft axis, a signal generator connected for operation by said pendulum whereby in response to craft yaw and to displacement of the craft vertical axis relative to dynamic vertical a control signal is developed at said generator, and means responsive to said signal and adapted for operating said rudder.

2. An automatic control system for a craft rudder to coordinate turning of the craft initiated by craft aileron, comprising a pendulum positioned forwardly of the craft center of gravity and responsive, during a craft turn, to yaw acceleration for developing a yaw acceleration signal, and means responsive to said signal and adapted for operating said rudder.

3. An automatic control system for a craft rudder comprising means for developing, during a craft turn, a composite signal representing displacement of the craft vertical axis relative to dynamic vertical and yaw acceleration, means for integrating said signal, and means responsive to said integrated signal and adapted for operating said rudder.

4. An automatic control system for a craft rudder comprising means for developing, during a craft turn, a composite signal representing displacement of the craft vertical axis relative to dynamic vertical and yaw acceleration, means for integrating said signal, means for segregating from the composite signal that portion representing dynamic vertical displacement, and means responsive to said integrated and segregated signals and adapted for operating said rudder.

5. An automatic control system for a craft rudder to coordinate turning of the craft initiated by craft aileron comprising a pendulum, means mounting said pendulum for movement about an axis parallel with the craft fore and aft axis, said pendulum being arranged forward of the craft's center of gravity, a signal generator connected for operation by said pendulum whereby in response to a displacement of the craft vertical axis relative to dynamic vertical and to craft yaw a control signal which is a function of craft dynamic vertical displacement and of craft yaw is developed by said generator, and means responsive to said signal adapted for operating said rudder.

6. An automatic control system for a craft rudder comprising a pendulum, means mounting said pendulum for movement about an axis parallel with the craft fore and aft axis, said pendulum being arranged forward of the craft's center of gravity whereby it responds to both yaw acceleration and a displacement of the craft vertical axis relative to dynamic vertical, and means actuated by said pendulum for developing a composite signal representing both yaw acceleration and dynamic vertical displacement adapted for operating said rudder.

7. An automatic control system for a craft rudder comprising a pendulum, means mounting said pendulum for movement about an axis parallel with the craft fore and aft axis, said pendulum being arranged forward of the craft's center of gravity whereby it responds to both yaw acceleration and a displacement of the craft vertical axis relative to dynamic vertical, means actuated by said pendulum for developing a composite signal representing both yaw acceleration and dynamic vertical displacement, and means for integrating said signal adapted for operating said rudder.

8. An automatic control system for a craft rudder comprising a damped pendulum, means mounting said pendulum for movement about an axis parallel with the craft fore and aft axis, said pendulum being arranged forward of the craft's center of gravity whereby it responds to displacement of the craft vertical axis relative to dynamic vertical, said pendulum also responding to and integrating yaw acceleration, and signal developing means actuated by said pendulum and developing a signal for rudder control representing both yaw rate and dynamic vertical displacement.

9. An automatic control system for a craft rudder comprising a damped pendulum, means mounting said pendulum for movement about an axis parallel with the craft fore and aft axis, said pendulum being arranged forward of the craft's center of gravity whereby it responds to and integrates yaw acceleration, and signal developing means actuated by said pendulum and developing a signal for rudder control representing yaw rate.

10. Means for coordinating turning of a craft intiated by craft aileron, including a pendulum positioned forwardly of the craft center of gravity and swingable about an axis parallel with the craft fore and aft axis, signal developing means actuated by said pendulum and developing a signal which is a function of craft yaw and displacement of the craft vertical axis relative to the dynamic vertical, and driving means operatively associated with said signal means and responsive to said signal for operating craft rudder to coordinate the turn.

11. An automatic control system for a craft rudder, comprising a pendulum, means mounting the pendulum for movement about an axis parallel with the craft fore and aft axis, said pendulum being arranged forward of the craft's center of gravity, and signal developing means actuated by the pendulum and developing a signal for rudder control which is a function of craft yaw and displacement of the craft vertical axis relative to the dynamic vertical.

12. An automatic control system for a craft rudder, comprising a pendulum, means mounting the pendulum for movement about an axis parallel with the craft fore and aft axis, said pendulum being arranged forward of the craft's center of gravity, whereby it responds to yaw acceleration, and signal developing means actuated by the pendulum and developing a signal for rudder control representing yaw rate.

References Cited in the file of this patent

UNITED STATES PATENTS

| | | |
|---|---|---|
| 2,162,862 | Protzen | June 20, 1939 |
| 2,450,907 | Newton | Oct. 12, 1948 |
| 2,554,512 | Varian | May 29, 1951 |
| 2,567,922 | Brannin | Sept. 18, 1951 |
| 2,627,384 | Esval | Feb. 3, 1953 |